US012725174B2

(12) United States Patent
Cho et al.

(10) Patent No.: US 12,725,174 B2
(45) Date of Patent: Sep. 1, 2026

(54) METHOD, SERVER AND PROGRAM FOR PROVIDING ARTIFICIAL INTELLIGENCE-BASED COUNTERFEIT ANALYSIS SERVICE

(71) Applicant: Pinokio Lab Corp., Seoul (KR)

(72) Inventors: Yongsuk Cho, Goyang-si (KR); Sungeui Lee, Seoul (KR)

(73) Assignee: Pinokio Lab Corp., Seoul (KR)

( * ) Notice: Subject to any disclaimer, the term of this patent is extended or adjusted under 35 U.S.C. 154(b) by 0 days.

(21) Appl. No.: 18/907,813

(22) Filed: Oct. 7, 2024

(65) Prior Publication Data

US 2025/0173739 A1 May 29, 2025

(30) Foreign Application Priority Data

Nov. 27, 2023 (KR) ........................ 10-2023-0166199

(51) Int. Cl.
*G06Q 30/018* (2023.01)
*G06T 7/00* (2017.01)

(52) U.S. Cl.
CPC ....... *G06Q 30/0185* (2013.01); *G06T 7/0004* (2013.01)

(58) Field of Classification Search
CPC .................................................... G06T 7/0004
See application file for complete search history.

(56) References Cited

U.S. PATENT DOCUMENTS

| | | | | |
|---|---|---|---|---|
| 2016/0300107 | A1* | 10/2016 | Callegari | G06V 20/80 |
| 2016/0364936 | A1* | 12/2016 | Gao | H04N 23/84 |
| 2017/0161810 | A1* | 6/2017 | Nair | G06F 16/5854 |
| 2017/0287147 | A1* | 10/2017 | Takahashi | G06T 7/35 |
| 2018/0349695 | A1* | 12/2018 | Le Henaff | G06K 19/06037 |
| 2019/0236614 | A1* | 8/2019 | Burgin | G06V 10/764 |
| 2021/0117984 | A1* | 4/2021 | Sharma | G07D 7/20 |
| 2021/0192340 | A1* | 6/2021 | Stonehouse | G06N 3/045 |
| 2021/0374476 | A1* | 12/2021 | Heikel | G06Q 30/0185 |
| 2022/0414902 | A1* | 12/2022 | Kannas | G06T 7/337 |
| 2023/0385896 | A1* | 11/2023 | Gonta | G06N 3/08 |
| 2024/0403897 | A1* | 12/2024 | Tami | G06Q 30/0185 |
| 2024/0428027 | A1* | 12/2024 | Feldman | G06K 7/10366 |

FOREIGN PATENT DOCUMENTS

| | | | |
|---|---|---|---|
| KR | 10-2018-0024566 | A | 3/2018 |
| KR | 10-2020-0088682 | A | 7/2020 |
| KR | 10-2202788 | B1 | 1/2021 |
| KR | 10-2530379 | B1 | 5/2023 |

* cited by examiner

*Primary Examiner* — Vincent M Cao
(74) *Attorney, Agent, or Firm* — Studebaker Brackett PLLC

(57) ABSTRACT

In an embodiment of the present invention to solve the above-described problem, a method of providing an artificial intelligence-based counterfeit analysis service is disclosed. The method may include acquiring an object image related to an object, acquiring a sample object image corresponding to the object image, providing one or more guide images corresponding to the sample object image, acquiring one or more object detail images corresponding to each of the one or more guide images, and performing an analysis on the one or more guide images and the one or more object detail images to determine whether the object is genuine.

10 Claims, 8 Drawing Sheets

METHOD, SERVER AND PROGRAM FOR PROVIDING ARTIFICIAL INTELLIGENCE-BASED COUNTERFEIT ANALYSIS SERVICE

CROSS-REFERENCE TO RELATED APPLICATION

This application claims priority to and the benefit of Korean Patent Application No. 10-2023-0166199, filed on Nov. 27, 2024, the disclosure of which is incorporated herein by reference in its entirety.

BACKGROUND

1. Field of the Invention

The present invention relates to a method of providing a counterfeit analysis service, and more particularly, to a method, server, and computer program for providing a counterfeit analysis service that uses artificial intelligence to analyze an image related to an object to determine whether a product is counterfeit.

2. Discussion of Related Art

Recently, the domestic and international luxury product market size has been gradually expanding due to abundant liquidity, and the illegal distribution of counterfeit products has also become active with the expansion of the luxury product market size.

The counterfeit product market size has been steadily increasing around the world, and the fashion industry, in particular, is suffering the most. In addition, extensive damage is occurring to various brands with premiums such as electronic appliances, watches, and medical devices.

Counterfeit products may cause various social, environmental, health, and safety problems beyond simple economic problems. For example, the quality of counterfeit products (or fake products) is lower than that of official products (or genuine products). In particular, counterfeit products such as electrical appliances, medicines, and cosmetics may not comply with safety standards, which may not only pose a threat to health and safety of users, and but also cause financial losses to consumers who mistake counterfeit products for genuine products and purchase the counterfeit products. In addition, the distribution of counterfeit products may reduce sales of genuine products, and also have an adverse effect on companies because it may damage brand recognition due to low quality. For this reason, many countries are implementing strict regulations and monitoring of counterfeit products.

Accordingly, various methods are being used to verify and block counterfeit products during a customs clearance process. In general, counterfeit products are inspected during a customs clearance process based on human inspection. For example, by providing education and training to customs authorities on how to distinguish genuine products from counterfeit products, the counterfeit products may be effectively detected, or by cooperating with owners or representatives of specific brands to receive information and educational materials on counterfeit products, the counterfeit products may be distinguished.

Since various products go through customs clearance, many people with specialized knowledge in each field or each brand may be required for this. However, there is a problem that there is a lack of specialized personnel in each field to distinguish counterfeit products due to the large amount of products going through customs clearance.

Meanwhile, with the advent of the 4th Industrial Revolution centered on the development and integration of digital technologies such as big data, artificial intelligence, Internet of Things (IoT), and robot technology, automated systems are being developed and provided in various industrial fields. In particular, data-centric economic systems based on artificial intelligence and big data are expanding, and creative business models utilizing the data-centric economic systems are actively emerging.

Therefore, in order to resolve the side effects of the expansion of the luxury products market size, there may be a demand for research and development on a service that uses artificial intelligence technology to automatically determining whether a product is counterfeit.

PATENT DOCUMENT

Korean Laid-Open Patent Publication No. 10-2018-0024566

SUMMARY OF THE INVENTION

The present invention is directed to providing an artificial intelligence-based counterfeit analysis service that determines whether an object is counterfeit even without specialized knowledge of a specific object by automatically determining whether a product is counterfeit using the artificial intelligence.

Objects of the present invention are not limited to the above-mentioned objects. That is, other objects that are not mentioned may be obviously understood by those skilled in the art from the following description.

According to an aspect of the present invention, there is provided a method of providing an artificial intelligence-based counterfeit analysis service. The method includes acquiring a sample object image corresponding to an object image related to an object, providing one or more guide images corresponding to the sample object image, acquiring one or more object detail images corresponding to each of the one or more guide images, and determining whether the object is genuine by performing an analysis on the one or more guide images and the one or more object detail images.

The sample object image may include an image captured from an actual genuine product related to the object, and the one or more guide images may be detailed images of each of one or more factors that affect determination of whether the object is genuine within the object image and images that serve as references for acquiring the one or more object detail images.

The acquiring of the sample object image corresponding to the object image may include acquiring image category information corresponding to the object image, and acquiring the sample object image by searching an image database based on the image category information and the object image, and the image database may pre-store information on at least one of genuine information, fake information, and counterfeit determination information corresponding to each of a plurality of objects by subdividing the information for each type of objects.

The acquiring of the one or more object detail images corresponding to each of the one or more guide images may include acquiring a plurality of first object detail candidate images corresponding to a first guide image, identifying a plurality of objects included in the first guide image and each of the plurality of first object detail candidate images, and selecting a first object detail image corresponding to the first guide image through a comparison based on the plurality of objects identified in each image.

The determining of whether the object is genuine may include grouping corresponding images among the one or more guide images and the one or more object detail images to generate one or more verification image sets, processing each of the one or more verification image sets as input to a verification model to output matching determination information on whether the images corresponding to each verification image set match, and determining whether the object is genuine based on the matching determination information to generate information for determining whether the object is genuine.

The verification model may include an object extraction model that identifies and extracts a main analysis object from images included in each of the one or more verification image sets to generate one or more extracted image sets, and output the matching determination information based on the one or more extracted image sets generated by the object extraction model.

The determining of whether the object is genuine may include generating and providing a user comparison interface for manual determination, generating genuine product determination information based on a user's input to the user comparison interface, and generating information for determining whether the object is genuine based on the genuine product determination information, and the user comparison interface may include a comparison display screen for comparing and displaying guide images and object detail images corresponding to each other.

The generating and providing of the user comparison interface for the manual determination may include generating a guide extraction image and an object detail extraction image corresponding to each guide image and each object detail image using an object extraction model, and the user comparison interface may include a detail confirmation graphic object that receives a user's input for comparing and displaying the guide extraction image and the object detail extraction image corresponding to each of the guide image and the object detail image.

The user comparison interface may include an overlap confirmation graphic object that receives the user's input for comparing and displaying images corresponding to at least one of a verification image set related to the guide image and the object detail image or a verification image set related to the guide extraction image and the object detail extraction image by overlapping the images.

According to another aspect of the present invention, there is provided a server for performing a method of providing an artificial intelligence-based counterfeit analysis service. The server includes a memory configured to store one or more instructions and a processor configured to execute the one or more instructions stored in the memory, and the processor may perform the above-described method of providing the artificial intelligence-based counterfeit analysis service by executing the one or more instructions.

According to another aspect of the present invention, there is provided a computer-readable recording medium. The computer-readable recording medium may perform the above-described method of providing an artificial intelligence-based counterfeit analysis service in conjunction with a computer which is hardware.

Other detailed contents of the present invention are described in the detailed description and are illustrated in the drawings.

BRIEF DESCRIPTION OF DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
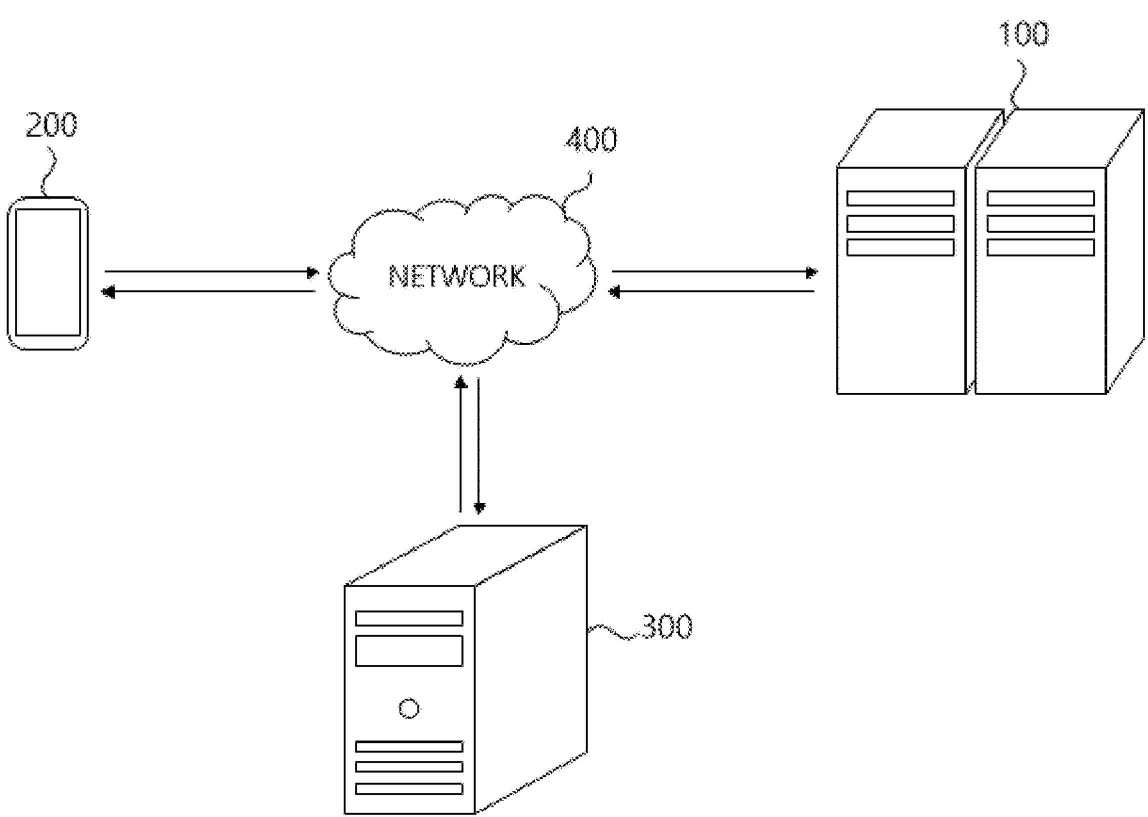
FIG. 1 is a schematic diagram of a system for performing a method of providing an artificial intelligence-based counterfeit analysis service according to an embodiment of the present invention.

Hereinafter, various embodiments will be described with reference to the drawings. In this specification, various descriptions are presented to provide an understanding of the invention. However, it is obvious that these embodiments may be practiced without these specific descriptions.

Terms used herein "component," "module," "system," etc., refer to a computer-related entity, hardware, firmware, software, a combination of software and hardware, or an implementation of software. For example, the component may be, but is not limited to, a procedure running on a processor, a processor, an object, an execution thread, a program, and/or a computer. For example, both an application running on a computing device and the computing device may be a component. One or more components may reside within a processor and/or execution thread. One component may be localized within one computer. One component may be distributed between two or more computers. In addition, these components may be executed from various computer-readable media having various data structures stored therein. Components may communicate via local and/or remote processes (e.g., data from one component interacting with other components in a local system and a distributed system and/or data transmitted to other systems via networks such as the Internet according signals), for example according to signals with one or more data packets.

In addition, the term "or" is intended to mean an inclusive "or," not an exclusive "or." That is, unless otherwise specified or clear from context, "X uses A or B" is intended to mean one of the natural implicit substitutions. That is, when either X uses A; X uses B; or X uses both A and B, "X uses A or B" may apply to either of these cases. In addition, the term "and/or" used herein should be understood to refer to and include all possible combinations of one or more of the related items listed.

In addition, the terms "include" and/or "including" should be understood to mean that the corresponding feature and/or component is present. However, the terms "include" and/or "including" should be understood as not excluding the presence or addition of one or more other features, components and/or groups thereof. In addition, unless otherwise specified or the context is clear to indicate a singular form, the singular form in the present specification and in the claims should generally be construed to mean "one or more."

In addition, those skilled in the art should recognize that various illustrative logical blocks, configurations, modules, circuits, means, logic, and algorithm steps described in connection with the embodiments disclosed herein may be implemented by electronic hardware, computer software, or a combination of both. To clearly illustrate interchangeability of hardware and software, various illustrative components, blocks, configurations, means, logics, modules, circuits, and steps have been described above generally in terms of their functionality. Whether such functionality is implemented by hardware or software will depend on the specific application and design constraints imposed on the overall system. Those skilled in the art may implement the described functionality in a variety of ways for each specific application. However, such implementation determinations should not be construed as departing from the scope of the present invention.

The description of the presented embodiments is provided to enable those skilled in the art to make or use the present invention. Various modifications to these embodiments will be apparent to those skilled in the art. The general principles defined herein may be applied to other embodiments without departing from the scope of the invention. Therefore, the present invention is not limited to the embodiments presented herein. The present invention should be interpreted in the broadest scope consistent with the principles and novel features presented herein.

In this specification, a computer means all kinds of hardware devices including at least one processor, and can be understood as including a software configuration which is operated in the corresponding hardware device according to the embodiment. For example, the computer may be understood as a meaning including all of smart phones, tablet PCs, desktops, laptops, and user clients and applications running on each device, but is not limited thereto.

Hereinafter, embodiments of the present invention will be described in detail with reference to the accompanying drawings.

Each step described in this specification is described as being performed by a computer, but subjects of each step are not limited thereto, and according to embodiments, at least some of each steps can also be performed by different devices.

FIG. 1 is a schematic diagram of a system for performing a method of providing an artificial intelligence-based counterfeit analysis service according to an embodiment of the present invention. As illustrated in FIG. 1, a system for performing a method of providing an artificial intelligence-based counterfeit analysis service according to an embodiment of the present invention may include a server 100 providing the artificial intelligence-based counterfeit analysis service, a user terminal 200, and an external server 300. Here, the system for performing the method of providing an artificial intelligence-based counterfeit analysis service illustrated in FIG. 1 is according to an embodiment, and components of the system are not limited to the embodiment illustrated in FIG. 1, and may be added, changed, or omitted as needed.

In an embodiment, the server 100 for performing the method of providing an artificial intelligence-based counterfeit analysis service may provide a counterfeit analysis service for an object.

In the present invention, an object may include various products that are targets for determining whether the object is genuine or counterfeit, and may be, for example, bags, clothing, electronic products, watches, medical devices, etc., of premium brands, but is not limited thereto.

Specifically, the server 100 may acquire an object image related to the object in order to determine whether the object (or product) is genuine or a counterfeit (imitation or fake). In addition, the server 100 may identify a sample object image corresponding to the acquired object image, and acquire one or more guide images corresponding to the sample object image and provide the acquired guide images to a user. Here, the sample object image is an image identified based on the object image, and may be an image captured from an actual genuine product related to an object to be determined as genuine. In addition, the one or more guide images may be detailed images regarding each of the one or more factors that affect the determination of whether an object is genuine within a sample object image. In an embodiment, the one or more guide images corresponding to the sample object image may be pre-matched and defined by an expert (e.g., a brand manager of each brand). For example, one or more guide images corresponding to a sample object image corresponding to model a, which is a bag of brand A, may include a first guide image related to a first area (e.g., stitch of a zipper portion), a second guide image related to a second area (e.g., a handle portion of a bag), a third guide image related to a third area (e.g., a brand logo image), and a fourth guide image related to a fourth area (e.g., a surface pattern). The specific description of the sample object image and the one or more guide images corresponding to the sample object image described above is only an example, and the present invention is not limited thereto.

That is, there may be criteria for determining whether the object is counterfeit may exist for each sample object image corresponding to the object, and criteria corresponding to determining whether the object is counterfeit corresponding to each object are pre-matched to each object as one or more guide images and stored. In an embodiment, one or more guide images corresponding to each object may be specified and pre-classified through experts of each brand.

According to an embodiment, the server 100 may provide one or more guide images, and may acquire one or more object detail images corresponding to each of the provided one or more guide images.

For a specific example, the server 100 may receive an object image related to a specific object from the user terminal 200, and identify and acquire a sample object image based on the received object image. In addition, the server 100 may acquire one or more guide images corresponding to the identified sample object image and provide the acquired guide image to the user terminal 200. In an embodiment, the server 100 may identify the sample object image through an image search using a pre-built image database, and acquire one or more guide images related thereto.

The user terminal 200 may capture each area of the object based on one or more guide images received from the server 100 to generate one or more object detail images and transmit the generated images to the server 100. In other words, the user may generate each object detail image by capturing images referring to each of the guide images received from the server 100 through a user terminal including a capturing module or linked to the capturing module, and transmits the generated object detail image to the server 100. That is, each of the one or more object detail images is an image of an object captured by referring to each of the one or more guide images, and thus may be an image that includes a similar composition and similar factors to each of the guide images.

The server 100 may determine whether the object is genuine based on the image analysis based on each of the one or more object detail images and each of the one or more guide images received and acquired from the user terminal 200. Since the guide images may be images regarding factors (e.g., stitching, logos, patterns, etc.) that are the basis for determining whether the object is genuine and the object detail images acquired through capturing images referring to the guide images are images acquired from an actual object, it is possible to determine whether the object is genuine by comparing the corresponding guide images and object detail images. For example, when the corresponding guide images and object detail images match each other, the object corresponding to the corresponding images may be genuine, and when the corresponding guide images and object detail images do not match each other (i.e., when there are different parts in each image), the object corresponding to the corresponding images may be counterfeit (imitation or fake). For example, when the stitching patterns (e.g., interval between stitches, etc.) are different in the first guide image and a first object detail image, the server 100 may determine that the images do not to match each other, and determine whether the object is genuine or counterfeit based on the matching determination information between various images.

That is, the server 100 may identify a target object to determine whether the object is genuine based on the object image, and provide a sample object image corresponding to the identified object and one or more guide images corresponding to the sample object image to the user terminal 200. The user of the user terminal 200 may acquire one or more object detail images based on the provided one or more guide images and transmit the acquired object detail images to the server 100. In this case, the server 100 may determine whether the object is genuine by comparing each guide image related to factors used for determining whether the object is genuine with an object detail image acquired through a similar composition to the guide image from the actual object.

Therefore, the user may capture the object detail images corresponding to the guide images provided by the server 100 and uploading the captured object detail images to confirm whether the object is genuine or fake. Accordingly, even a user without specialized knowledge of a specific object may easily confirm whether an object is fake. In other words, a user does not need to have separate education and training to distinguish counterfeit products during the customs clearance process, and a separate expert for evaluation may not need to be assigned for each brand or each object.

According to an embodiment, the server 100 for performing the method of providing an artificial intelligence-based counterfeit analysis service may include any server implemented by an application programming interface (API). For example, the user terminal 200 may acquire an object image and one or more object detail images and transmit the acquired object image or one or more object detail images to the server 100 through a cloud API. For example, the server 100 may acquire the object image and one or more object detail images from the user terminal 200, and may determine that the object is a counterfeit through the analysis of the object image and the object detail images.

In an embodiment, the determination of whether one or more guide images and one or more object detail images match may be performed based on a pre-trained artificial intelligence model (e.g., an image matching analysis model). In the present invention, a neural network model may determine whether the images match each other through the analysis and comparison based on the images. The server 100 may perform the comparative analysis between the corresponding images using the artificial intelligence model.

In an embodiment, the artificial intelligence model (e.g., image matching analysis model) is composed of one or more network functions, and the one or more network functions may be composed of a set of interconnected computational units, which may generally be referred to as "nodes." These "nodes" may also be referred to as "neurons." One or more network functions are configured to include at least one or more nodes. Nodes (or neurons) that constitute one or more network functions may be interconnected by one or more "links."

Within the artificial intelligence model, one or more nodes connected through the link may form a relative relationship of the input node and output node. The concepts of the input node and the output node are relative, and any node in the relationship as the output node with respect to one node may be in the relationship as an input node in the relationship with another node, and vice versa. As described above, the relationship between the input node and the output node may be generated around the link. One or more output nodes may be connected to one input node through the link, and vice versa.

In the relationship between the input node and the output node connected through one link, a value of the output node may be determined based on data input to the input node. Here, the node connecting the input node and the output node may have a weight. The weight may be variable, and may vary by a user or algorithm in order for the artificial intelligence model to perform the desired functions. For example, when one or more input nodes are connected to one output node by the respective links, the value of the output node may be determined based on the values input to the input nodes connected to the output node and the weights set on the links corresponding to the respective input nodes.

As described above, the artificial intelligence model interconnects one or more nodes through one or more links to form the relationship between the input node and the output node within the artificial intelligence model. The characteristics of the artificial intelligence model may be determined according to the number of nodes and links within the artificial intelligence model, the correlation between nodes and links, and the weight values assigned to each link. For example, if there are two artificial intelligence models with the same number of nodes and links and different weight values between the links, the two artificial intelligence models may be recognized as different from each other.

Some of the nodes constituting the artificial intelligence model may constitute one layer based on distances from an initial input node. For example, a set of nodes with a distance n from the initial input node may constitute an n layer. The distance from the initial input node may be defined by the minimum number of links that should be passed to reach the corresponding node from the initial input node. However, this definition of the layer is arbitrary for explanation purposes, and the order of the layer within the artificial intelligence model may be defined in a different way than that described above. For example, the layer of the nodes may be defined by a distance from a final output node.

The initial input nodes may refer to one or more nodes, to which data is directly input without going through links in relationships with other nodes, among the nodes in the artificial intelligence model. Alternatively, the initial input nodes may refer to nodes that do not have other input nodes connected by the link in the relationship between the nodes based on the link within the artificial intelligence model network. Similarly, the final output nodes may refer to one or more nodes that do not have output nodes in the relationship with other nodes among the nodes in the artificial intelligence model. In addition, hidden nodes may refer to nodes that constitute the artificial intelligence model rather than the first input node and the last output node. The artificial intelligence model according to the embodiment of the present invention may have more nodes of the input layer than the nodes of the hidden layer close to the output layer, and may be the artificial intelligence model in which the number of nodes decreases as it progresses from the input layer to the hidden layer.

The artificial intelligence model may include one or more hidden layers. The hidden node of the hidden layer may use an output of a previous layer and outputs of neighboring hidden nodes as inputs. The number of hidden nodes for each hidden layer may be the same or different. The number of nodes of the input layer may be determined based on the number of data fields of the input data and may be the same as or different from the number of hidden nodes. The input data input to the input layer may be calculated by the hidden node of the hidden layer and output by a fully connected layer (FCL) which is the output layer.

In various embodiments, an artificial intelligence model may be subjected to supervised learning using a plurality of pieces of image data and feature information corresponding to each image data as training data. However, the present embodiment is not limited thereto, and various learning methods may be applied.

Here, the supervised learning is generally a method of labeling specific data and information related to the specific data to generate training data and performing training using the generated training data, and refers to a method of labeling two pieces of data with a causal relationship to generate training data and performing training through the generated training data.

In an embodiment, the server 100 may determine whether to stop training using verification data when training of one or more network functions is performed more than a predetermined epoch. The predetermined epoch may be part of the overall training target epoch.

The verification data may be composed of at least some of the labeled training data. That is, the server 100 performs the training of the artificial intelligence model through the training data, and after the training of the artificial intelligence model is repeated more than the predetermined epoch, may use the verification data to determine whether the training effect of the artificial intelligence model is the predetermined level or more. For example, the server 100 may perform iterative training of 10 times, which is the predetermined epoch, and then perform iterative training of 3 times using 10 verification data when performing the training, in which the target number of times of iterative training is 10 times, using 100 training data, and may determine that further training is meaningless when a change in output of an artificial intelligence model during the iterative training of 3 times is a predetermined level or less and terminate the training.

In other words, the verification data may be used to determine the completion of training based on whether the effect of training for each epoch is a certain level or more or a certain level or less in the repetitive training of the artificial intelligence model. The above-described training data, the number of verification data, and the number of times of repetitions are only examples and the present invention is not limited thereto.

The server 100 may test performance of one or more network functions using test data to determine whether to activate one or more network functions, thereby generating the artificial intelligence model. The test data may be used to verify the performance of the artificial intelligence model and may be composed of at least part of the training data. For example, 70% of the training data may be used to train the artificial intelligence model (i.e., training for adjusting weights to output result values similar to the label), and 30% of the training data may be used to verify the performance of the artificial intelligence model. The server 100 may input the test data to the trained artificial intelligence model, measure the errors, and determine whether to activate the artificial intelligence model depending on whether the performance is the predetermined performance or more.

The server 100 may verify the performance of the trained artificial intelligence model using the test data on the trained artificial intelligence model, and may be activated to use the corresponding artificial intelligence model in other applications when the performance of the trained artificial intelligence model is a predetermined reference or more.

In addition, the server 100 may deactivate and discard the corresponding artificial intelligence model when the trained artificial intelligence model is the predetermined reference or less. For example, the server 100 may determine the performance of the artificial intelligence model generated based on factors such as accuracy, precision, and recall. The above-described performance evaluation reference is only an example and the present invention is not limited thereto. The server 100 may independently train each artificial intelligence model to generate a plurality of artificial intelligence model models, and evaluate the performance to use only the artificial intelligence model with a certain performance or more. However, the present invention is not limited thereto.

Throughout this specification, a computational model, a neural network, a network function, and a neural network may be used as the same meaning. (Hereinafter, these terms are unified as the neural network.) A data structure may include the neural network. The data structure including the neural network may be stored in a computer-readable medium. The data structure including the neural network may also include data input to the neural network, weights of the neural network, hyperparameters of the neural network, data acquired from the neural network, activation functions associated with each node or layer of the neural network, and loss functions for training the neural network. The data structure including the neural network may include any of the components disclosed above. The data structure including the neural network may be configured to include the data input to the neural network, the weights of the neural network, the hyperparameters of the neural network, the data acquired from the neural network, the activation functions associated with each node or layer of the neural network, the loss functions for training the neural network, and any combination thereof. In addition to the configurations described above, the data structure including the neural network may include any other information that determines the characteristics of the neural network. In addition, the data structure may include all types of data used or generated in the computational process of the neural network and is not limited to the above. The computer-readable media may include computer-readable recording media and/or computer-readable transmission media. The neural network may generally be composed of a set of interconnected computational units, which may be referred to as nodes. These "nodes" may also be referred to as "neurons." The neural network is configured to include at least one node.

According to an embodiment of the present invention, server 100 may be a server providing a cloud computing service. More specifically, the server 100 is a type of Internet-based computing and may be a server that provides the cloud computing service that processes information not with the user's computer but with another computer connected to the Internet. The cloud computing services may be services that may store data on the Internet and allow users to use necessary data or programs anytime, anywhere through Internet access without having to load the necessary data or install programs on their computers, and allow the users to easily share and deliver data stored on the Internet with simple operations and clicks. In addition, the cloud computing services may be services that may not only simply store data in a server on the Internet, but may also perform desired tasks using functions of application programs provided on a web without having to install a separate program, and allow multiple people to perform tasks while sharing documents at the same time. In addition, the cloud computing services may be implemented in at least one of the following forms: Infrastructure as a Service (IaaS); Platform as a Service (PaaS); Software as a Service (Saas); a virtual machine-based cloud server; and a container-based cloud server. That is, the server 100 of the present invention may be implemented in the form of at least one of the above-described cloud computing services. The specific description of the cloud computing services described above is an example, and the present invention may include any platform for building a cloud computing environment.

In various embodiments, the server 100 may be connected to the user terminal 200 through the network, and generate and provide the image matching analysis model that analyzes whether images match, and in addition, provide information (e.g., information for analyzing whether the images match) verified through the image matching analysis model to the user terminal.

Here, the network may be a connection structure capable of exchanging information between respective nodes such as a plurality of terminals and servers. For example, the network may include a local area network (LAN), a wide area network (WAN), the Internet (World Wide Web (WWW)), a wired/wireless data communication network, a telephone network, a wired/wireless television communication network, or the like.

In addition, here, examples of the wireless data communication network include 3G, 4G, 5G, 3rd Generation Partnership Project (3GPP), 5th Generation Partnership Project (5GPP), long term evolution (LTE), world interoperability for microwave access (WiMAX), Wi-Fi, Internet, a LAN, a wireless LAN (WLAN), a WAN, a personal area network (PAN), radio frequency, a Bluetooth network, a near-field communication (NFC) network, a satellite broadcast network, an analog broadcast network, a digital multimedia broadcasting (DMB) network, etc, but are not limited thereto.

In an embodiment, the user terminal 200 may be connected to the server 100 through the network, provide an object image and one or more object detail images to the server 100, and receive information on whether the object is genuine in response to the provided object image and one or more object detail images.

Here, the user terminal 200 is a wireless communication device that ensures portability and mobility, and may include any type of handheld-based wireless communication device such as a navigation device, a personal communication system (PCS), global system for mobile communication (GSM), a personal digital cellular (PDC) phone, a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, or a tablet personal computer (PC), but are not limited thereto.

In an embodiment, the user terminal 200 may be a terminal possessed by a user that determines whether an object is authentic. The user terminal 200 may be configured to include a camera module, and may generate various images related to the object through capturing images and transmit the generated images to the server 100.

In an embodiment, the external server 300 may be connected to the server 100 through the network, and may provide various types of information/data necessary for the server 100 to analyze the image data using the artificial intelligence model, or receive, store, and manage result data derived by performing the image analysis using the artificial intelligence model. For example, the external server 300 may be a storage server separately provided outside the server 100, but is not limited thereto. The hardware configuration of the server 100 will be described below with reference to FIG. 2.

Figure 2:
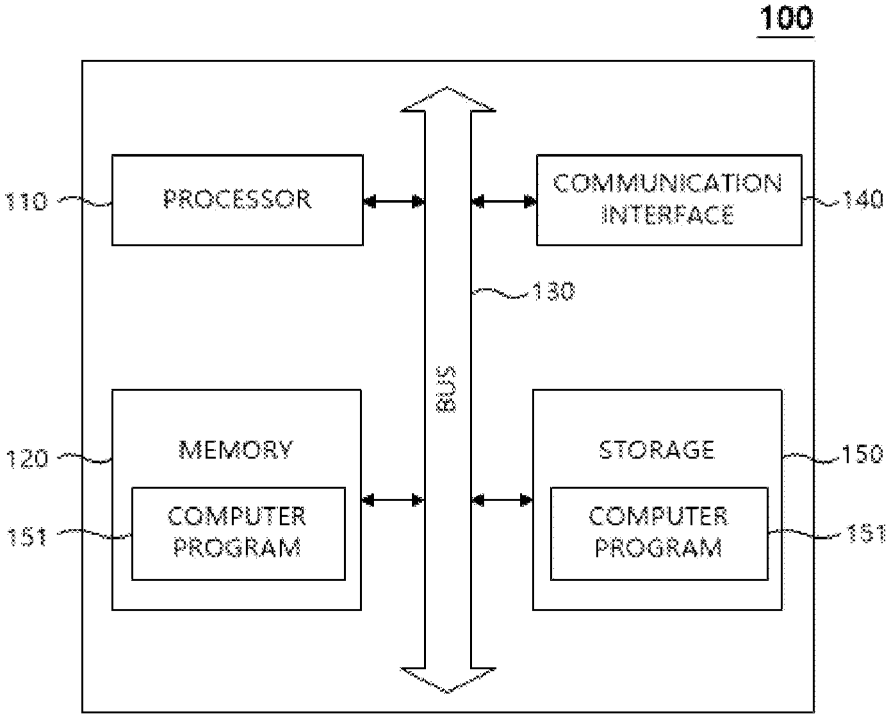
FIG. 2 is a hardware configuration diagram of a server for performing a method of providing an artificial intelligence-based counterfeit analysis service according to an embodiment of the present invention.

FIG. 2 is a hardware configuration diagram of a server for performing a method of providing an artificial intelligence-based counterfeit analysis service according to an embodiment of the present invention.

Referring to FIG. 2, the server 100 according to an embodiment of the present invention may include one or more processors 110, a memory 120 that loads a computer program 151 executed by the processor 110, a bus 130, a communication interface 140, and a storage 150 that stores the computer program 151. Here, only the components related to the embodiment of the present invention are illustrated in FIG. 2. Accordingly, those skilled in the art to which the present invention pertains may understand that other general-purpose components other than those illustrated in FIG. 2 may be further included.

The processor 110 controls an overall operation of each component of the server 100. The processor 110 may be configured to include a central processing unit (CPU), a micro processor unit (MPU), a micro controller unit (MCU), a graphic processing unit (GPU), or any type of processor well known in the art of the present invention.

The processor 110 may read the computer program stored in the memory 120 and perform the data processing for the artificial intelligence model according to the embodiment of the present invention. According to an embodiment of the present invention, the processor 110 may perform calculations for training the neural network. The processor 110 may perform calculations for training a neural network, such as processing input data for training in deep learning (DL), extracting features from the input data, calculating errors, and updating weights of the neural network using back-propagation.

In addition, the processor 110 may allow at least one of CPU, GPGPU, and TPU to process the training of the network function. For example, both the CPU and GPGPU may process the training of the network function and the data classification using the network function. In addition, in an embodiment of the present invention, processors of a plurality of computing devices may be used together to process training of a network function and data classification using the network function. In addition, a computer program executed in a computing device according to an embodiment of the present invention may be a CPU, GPGPU, or TPU executable program.

In this specification, the network function may be used interchangeably with the artificial neural network or neural network. In this specification, the network function may include one or more neural networks, and in this case, the output of the network function may be an ensemble of the outputs of one or more neural networks.

The processor 110 may read a computer program stored in the memory 120 and provide a neural network model (e.g., an image matching analysis model and an object extraction model) according to an embodiment of the present invention. According to an embodiment of the present invention, the processor 110 may perform calculations to train the neural network model.

According to an embodiment of the present invention, the processor 110 may generally process the overall operation of the server 100. The processor 110 may provide or process appropriate information or functions to the user or user terminal by processing signals, data, information, and the like, which are input or output through the above-described components, or by driving an application program stored in the memory 120.

In addition, the processor 110 may perform calculations on at least one application or program for executing the method according to the embodiments of the present invention, and the server 100 may include one or more processors.

In various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including at least one of a graphics processing unit, a RAM, and a ROM.

The memory 120 stores various types of data, commands, and/or information. The memory 120 may load the computer program 151 from the storage 150 to execute methods/operations according to various embodiments of the present invention. When the computer program 151 is loaded into the memory 120, the processor 110 may perform the method/operation by executing one or more instructions constituting the computer program 151. The memory 120 may be implemented as a volatile memory such as a RAM, but the technical scope of the present invention is not limited thereto.

The bus 130 provides a communication function between the components of the server 100. The bus 130 may be implemented as various types of buses, such as an address bus, a data bus, and a control bus.

The communication interface 140 supports wired/wireless Internet communication of the server 100. In addition, the communication interface 140 may support various communication manners other than the Internet communication. To this end, the communication interface 140 may be configured to include a communication module well known in the art of the present invention. In some embodiments, the communication interface 140 may be omitted.

The storage 150 may non-temporarily store the computer program 151. When the server 100 performs a process for providing an artificial intelligence-based counterfeit analysis service, the storage 150 may store various types of information necessary for providing a process for providing the artificial intelligence-based counterfeit analysis service.

The storage 150 may include a nonvolatile memory, such as a ROM, an erasable programmable ROM (EPROM), an electrically erasable programmable ROM (EEPROM), and a flash memory, a hard disk, a removable disk, or any well-known computer-readable recording medium in the art to which the present invention pertains.

The computer program 151 may include one or more instructions to cause the processor 110 to perform methods/operations according to various embodiments of the present invention when loaded into the memory 120. That is, the processor 110 may perform the method/operation according to various embodiments of the present invention by executing the one or more instructions.

In an embodiment, the computer program 151 may include one or more instructions to perform the method of providing an artificial intelligence-based counterfeit analysis service that includes acquiring an object image related to an object, acquiring a sample object image corresponding to the object image, providing one or more guide images corresponding to the sample object images, acquiring one or more object detail images corresponding to each of the one or more guide images, and performing an analysis on the one or more guide images and the one or more object detail images to determine whether the object is genuine.

Operations of the method or algorithm described with reference to the embodiment of the present invention may be directly implemented in hardware, in software modules executed by hardware, or in a combination thereof. The software module may reside in a RAM, a ROM, an erasable programmable ROM (EPROM), an electrically EPROM (EEPROM), a flash memory, a hard disk, a removable disk, a compact disc ROM (CD-ROM), or in any form of computer-readable recording media known in the art to which the invention pertains.

The components of the present invention may be embodied as a program (or application) and stored in media for execution in combination with a computer which is hardware. The components of the present invention may be executed in software programming or software elements, and similarly, embodiments may be realized in a programming or scripting language such as C, C++, Java, and assembler, including various algorithms implemented in a combination of data structures, processes, routines, or other programming constructions. Functional aspects may be implemented in algorithms executed on one or more processors. Hereinafter, the method of providing an artificial intelligence-based counterfeit analysis service performed by the server 100 will be described with reference to FIGS. 3 to 8.

Figure 3:
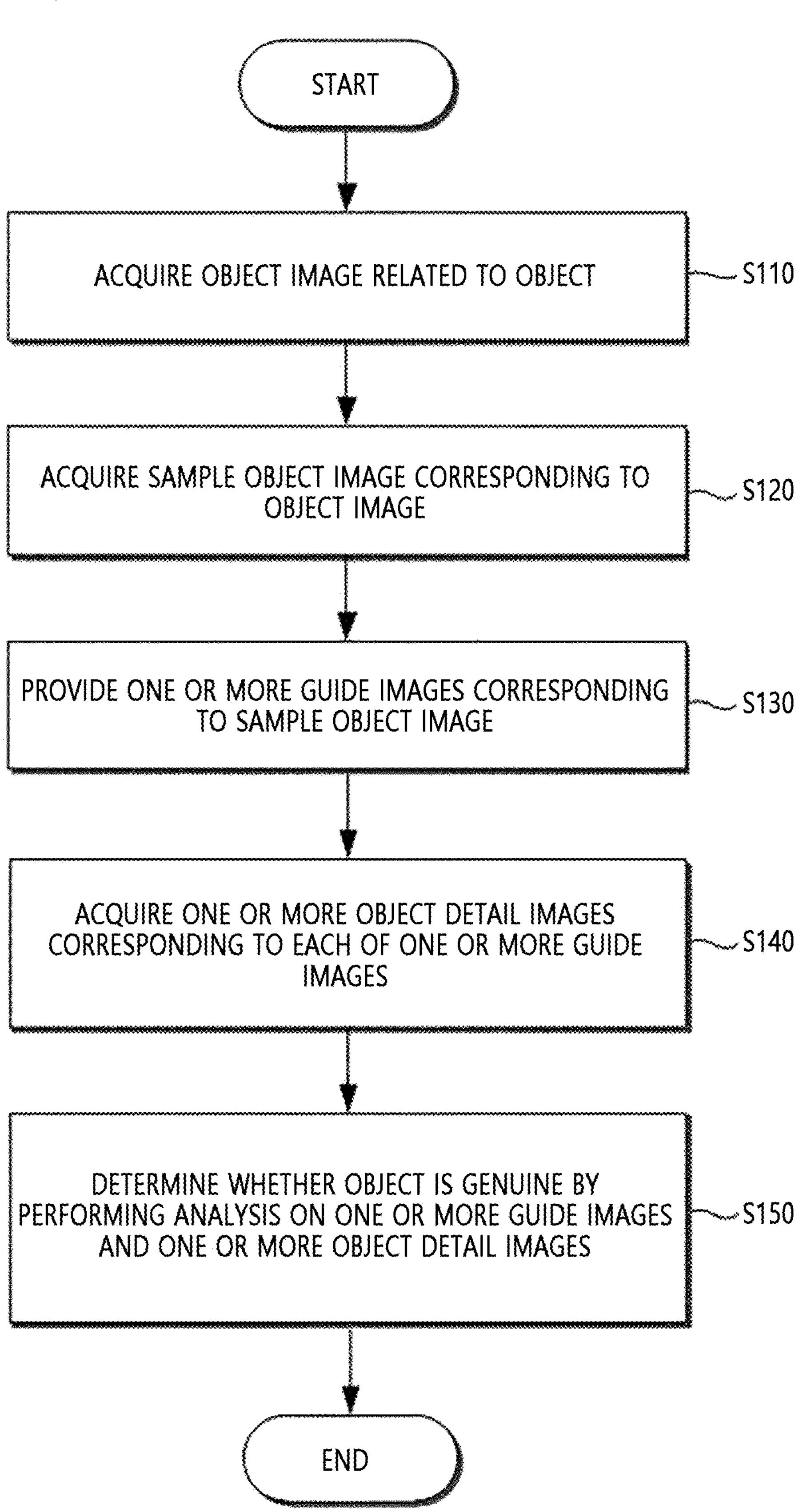
FIG. 3 is a flowchart schematically illustrating a method of providing an artificial intelligence-based counterfeit analysis service according to an embodiment of the present invention.

FIG. 3 is a flowchart schematically illustrating a method of providing an artificial intelligence-based counterfeit analysis service according to an embodiment of the present invention. The order of the operations illustrated in FIG. 3 may be changed as needed, and at least one operation may be omitted or added. That is, the following operations are only an example of the present invention, and the scope of the present invention is not limited thereto.

According to an embodiment of the present invention, the method of providing an artificial intelligence-based counterfeit analysis service may include acquiring an object image related to an object (S110).

In the present invention, an object may include various items that are targets for determining whether the object is genuine or counterfeit, and may be, for example, bags, clothing, electronic products, watches, medical devices, etc., of premium brands, but is not limited thereto. The object image may be an image captured from an object.

The acquisition of the object image according to an embodiment of the present invention may be made by receiving or loading the object image stored in the memory 120. In addition, the acquisition of the object image may be made by receiving or loading data from another storage medium, another computing device, or a separate processing module within the same computing device based on the wired/wireless communication means.

According to an embodiment, the object image may be acquired through the user terminal 200 related to the user. For example, the user terminal 200 includes a camera module for acquiring an image, and may capture various areas of a specific object using the camera module to generate a plurality of images and transmit the generated images to the server 100.

According to an embodiment of the present invention, the method of providing an artificial intelligence-based counterfeit analysis service may include acquiring the sample object image corresponding to the object image (S120).

The sample object image is an image identified based on the object image, and may be an image captured from an actual genuine product related to an object to be determined as genuine.

In an embodiment, the server 100 may receive the object image generated by capturing the object from the user terminal 200, and acquire the sample object image corresponding to the object image.

According to an embodiment of the present invention, the server 100 may acquire the sample object image through an image search for an image database using the object image.

In a specific embodiment, the acquiring of the sample object image corresponding to the object image may include acquiring image category information corresponding to the object image, and searching the image database based on the image category information and the object image to acquire the sample object image.

In an embodiment, the image database pre-stores information on at least one of genuine information, fake information, and counterfeit determination information corresponding to each of the plurality of objects by subdividing the information for each type of objects. The genuine information related to each object may include a genuine product object image (e.g., sample object image) related to the genuine product object, and the fake information related to each object may include a fake object image related to a fake object. The counterfeit determination information may include information on factors considered for counterfeit determination of an object, for example, information that a counterfeit product may be distinguished through a zipper area, a logo area, a serial number area, and a pattern area. Such counterfeit determination information may be different for each object.

According to an embodiment, experts of each brand may access the server 100 through the terminal and input the genuine information, the fake information, and the counterfeit determination information related to each object, and the server 100 may continuously update the image database based on the information input from each brand expert to make it more up-to-date. The server 100 may pre-build the image database by classifying it according to the type of object. For example, the image database may be pre-built by classifying a plurality of objects for each brand and category of the object.

In addition, in an embodiment, there may be the criteria for determining whether the object is counterfeit for each sample object image corresponding to the object, and the criteria corresponding to determining whether the object is counterfeit corresponding to each object are pre-matched to each object as one or more guide images and stored in the image database. In an embodiment, one or more guide images corresponding to each object may be specified and pre-classified through experts of each brand.

When acquiring the object image, the server 100 may acquire the image category information through the image analysis of the acquired object image. In an embodiment, the server 100 may use the artificial intelligence model that identifies various objects included in the image to acquire the mage category information corresponding to the object image based on various objects that are identified. For example, the server 100 may generate image category information indicating that a first object corresponding to a first object image is related to a bag of brand A through the image analysis of the first object image. For another example, the server 100 may generate image category information indicating that the second object corresponding to the second object image is related to shoes of brand B through the image analysis of the second object image. The specific description of each object and image category information of each object described above is only an example, and the present invention is not limited thereto.

The server 100 may perform a search on the image database based on the image category information corresponding to the object image. The server 100 identifies a specific group in the image database based on image category information, and performs an image search using the object image within the specific group to acquire the sample object image corresponding to the object image.

In the case of the image database, since a plurality of objects are grouped and classified for each brand and category of the object, there is an advantage of improved indexing speed when identifying the specific group based on the image category information. For example, when the image search is performed using the object image that the user wants to determine based on all of the plurality of sample object images pre-stored in the image database, the indexing speed decreases as the number of images to be compared increases. Accordingly, the server 100 may acquire the image category information corresponding to the object image, identify a specific group in the image database using the acquired image category information, and perform the image search using the object image within the identified group.

That is, when acquiring the object image corresponding to the object, the server 100 may extract the image category information corresponding to the acquired object image, and acquire the sample object image from the pre-built image database through the search using the object image and the image category information.

According to one embodiment of the present invention, the method of providing an artificial intelligence-based counterfeit analysis service may include providing one or more guide images corresponding to the sample object image (S130).

The one or more guide images may be detailed images regarding each of the one or more factors that affect the determination of whether an object is genuine within a sample object image. The guide images may be images of factors (e.g., stitching, logos, patterns, etc.) that are the basis for determining whether the object is genuine.

The one or more guide images corresponding to the sample object image may be defined by being pre-matched to the image database. For example, one or more guide images corresponding to a sample object image corresponding to model a, which is a bag of brand A, may include a first guide image related to a first area (e.g., stitching of a zipper portion), a second guide image related to a second area (e.g., a handle portion of a bag), a third guide image related to a third area (e.g., a brand logo image), and a fourth guide image related to a fourth area (e.g., a surface pattern). The specific description of the sample object image and the one or more guide images corresponding to the sample object image described above is only an example, and the present invention is not limited thereto.

That is, the sample object image is a genuine product object image corresponding to the object image that the user wants to determine whether the object is counterfeit, and the one or more guide images corresponding to the sample object image may include detailed images regarding each of one or more factors that affect the determination of whether an object is genuine. There may be criteria for determining whether the object is counterfeit may exist for each sample object image corresponding to the object, and criteria corresponding to determining whether the object is counterfeit corresponding to each object are pre-matched to each object as one or more guide images and stored. In an embodiment, one or more guide images corresponding to each object may be specified and pre-classified through experts of each brand.

The server 100 may identify the sample object image by searching the image database, acquire one or more pre-matched guide images corresponding to the identified sample object image, and provide the acquired guide images to the user terminal.

In an embodiment, one or more guide images may be images that serve as references for acquiring one or more object detail images. When one or more guide images are provided to the user terminal 200, the user acquires one or more object detail images by capturing each part (each factor) of the object by referring to the provided guide images.

That is, when acquiring a sample object image for a specific object (e.g., an object that a user wants to determine whether the object is counterfeit), the server 100 may acquire one or more guide images corresponding to the corresponding sample object images and provides the acquired guide images to the user terminal, thereby inducing the user of the user terminal to capture and generate images corresponding to each guide image.

According to one embodiment of the present invention, the method of providing an artificial intelligence-based counterfeit analysis service may include acquiring one or more object detail images corresponding to each of the one or more guide images (S140).

In an embodiment, the server 100 may receive one or more object detail images corresponding to each guide image from the user terminal. As described above, each of the object detail images may be an image captured by referring to each guide image. Each guide image is an image captured from each factor (e.g., zipper area, logo area, pattern area, etc.) of a genuine product object, and each object detail image may be an image related to each factor of an actual object acquired by capturing images referring to each guide image.

The user terminal 200 may capture each area of the object based on one or more guide images received from the server 100 to generate one or more object detail images and transmit the generated images to the server 100. In other words, the user may generate each object detail image by capturing images referring to each of the guide images received from the server 100 through a user terminal including a capturing module or linked to the capturing module, and transmits the generated object detail image to the server 100. That is, each of the one or more object detail images is an image of an object captured by referring to each of the one or more guide images, and thus may be an image that includes a similar composition and similar factors to each of the guide images.

In various embodiments, the server 100 may acquire a plurality of object detail candidate images corresponding to one guide image so that an object detail image similar to each guide image may be acquired, and select one of the plurality of acquired object detail candidate images to determine the object detail candidate image.

Specifically, the server 100 may receive the plurality of object detail candidate images corresponding to each guide image so that a more appropriate object detail image may be acquired corresponding to each guide image, and may select at least one of the plurality of received object detail candidate images and determine the selected object detail candidate image as the object detail image corresponding to the guide image. To this end, the server 100 may receive the plurality of object detail candidate images corresponding to one guide image from the user terminal.

In an embodiment, when one object detail candidate image is acquired from the user terminal 200 corresponding to one guide image, the server 100 may provide the user terminal with notification information to capture an additional object detail candidate image. For example, when one object detail candidate image is acquired corresponding to the first guide image, the server 100 may transmit guidance information to the user terminal 200 to capture an additional object detail image by referring to the first guide image. The user of the user terminal 200 may capture and generate an additional image through the guidance information, and transmit the generated image to the server 100. The server 100 continuously transmits notification information to the user terminal 200 until a certain number or more of object detail candidate images are acquired in response to one guide image.

Figure 4:
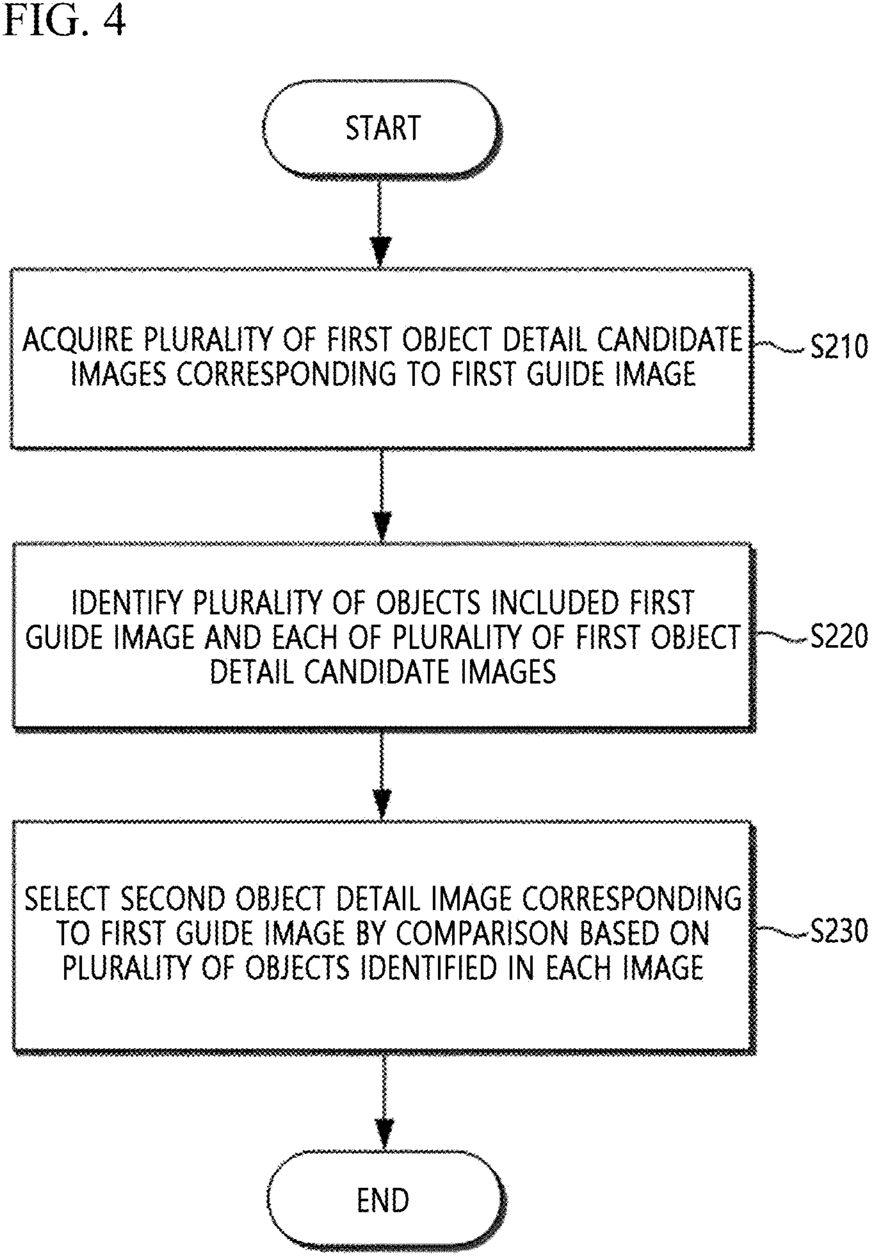
FIG. 4 is a flowchart schematically illustrating a process of acquiring one or more object detail images corresponding to each of one or more guide images according to an embodiment of the present invention.

In a specific embodiment, referring to FIG. 4, the acquiring of the one or more object detail images corresponding to each of one or more guide images may include acquiring the plurality of first object detail candidate images corresponding to the first guide image (S210).

For example, a first object detail first candidate image, a first object detail second candidate image, and a first object detail third candidate image may be acquired corresponding to the first guide image. For another example, a second object detail first candidate image, a second object detail first candidate image, a second object detail first candidate image, a second object detail first candidate image, and a second object detail first candidate image may be acquired corresponding to the second guide image.

As described above, three object detail candidate images may be acquired corresponding to the first guide image, and four object detail candidate images may be acquired corresponding to the second guide image. The specific description of each guide image and the object detail candidate images corresponding to each guide image described above is an example, and the present invention is not limited thereto.

In various embodiments, the server 100 may determine the number of object detail candidate images to be acquired corresponding to each guide image based on verification contribution information corresponding to each guide image. The verification contribution may be determined in advance corresponding to each guide image. For example, each guide image is a criterion for determining whether an object is genuine, but the reliability of the determination (or verification) may be different for each guide image. For a specific example, there may be the first guide image and the second guide image corresponding to the bag of brand A. The first guide image may be an image captured from the logo pattern, and the second guide image may be an image captured from an entire silhouette of the bag. In this case, the first guide image may guarantee higher reliability in determining whether the corresponding object is genuine than the second guide image.

That is, the influence on the determination of whether the object is genuine, i.e., the verification contribution, may be different for each guide image. The verification contribution corresponding to each guide image may be pre-stored and managed based on information input by an expert of each brand.

In the embodiment, the server 100 may identify the verification contribution information corresponding to the guide image, and the larger the verification contribution, the greater the number of object detail candidate images acquired corresponding to the guide image may be determined. For example, when the first guide image has a greater verification contribution than the second guide image, the server 100 may acquire five object detail candidate images corresponding to the first guide image and acquire three object detail candidate images corresponding to the second guide image. The specific numerical description of the object detail candidate images determined corresponding to each of the above-described guide images is only an example, and the present invention is not limited thereto.

That is, since the guide image that greatly affects the determination of whether the object is genuine should be compared accurately with each detailed image of the actual object, the server 100 may determine to secure a greater number of object detail candidate images so that the probability of acquiring a more appropriate object detail image for the guide image that has a great verification contribution increases.

In addition, the acquiring of the one or more object detail images corresponding to each of the one or more guide images may include identifying a plurality of objects included in the first guide image and each of the plurality of first object detail candidate images (S220).

The server 100 may acquire the plurality of object detail candidate images corresponding to one guide image, and when the plurality of object detail candidate images are acquired, the server may identify objects included in the guide image and each object detail candidate image. For example, in the case of the guide image corresponding to the bag of brand A and each object detail candidate image, various objects such as a zipper, a handle, and a decoration may be identified. The description of the specific object and various objects identified corresponding to the object described above is only an example, and the present invention is not limited thereto.

In addition, the acquiring of the one or more object detail images corresponding to each of the one or more guide images may include selecting the first object detail image corresponding to the first guide image through the comparison based on the plurality of objects identified in each image (S230).

In an embodiment, the server 100 may perform the comparison based on the type, location, and size of each object identified in each image to determine the object detail image corresponding to the guide image among the plurality of object detail candidate images. Determining the object detail image corresponding to the guide image may be to select an object detail image acquired most similar to the guide image among the plurality of object detail candidate images. In the case of the guide image, since it is determined whether the object is genuine based on the comparison with the object detail image, the object detail image should be captured and acquired with the composition similar to the guide image that is referenced.

That is, the object detail image selected from the plurality of object detail candidate images by the server 100 may include objects of the similar type to the objects included in the guide image, the arrangement of each object may be similar, and the size of each object may be similar. In other words, the server 100 may determine an object detail candidate image with the composition and arrangement most similar to the guide image among the object detail candidate images acquired corresponding to the actual object as the object detail image corresponding to the guide image.

Through this configuration, an object detail image similar to each guide image is acquired corresponding to each guide image, which may improve the accuracy of determining whether the object is genuine. For example, the accuracy may be prevented from being lowered in the process of determining whether the object is genuine due to the acquisition of the actual image (i.e., an object detail image) that is not similar to the guide image.

According to an embodiment of the present invention, the method of providing an artificial intelligence-based counterfeit analysis service may include determining whether the object is genuine by performing an analysis on one or more guide images and one or more object detail images (S150).

In an embodiment, the determining of whether the object is genuine may include grouping corresponding images among the one or more guide images and the one or more object detail images to generate one or more verification image sets, processing each of the one or more verification image sets as input to a verification model to output matching determination information on whether the images corresponding to each verification image set match, and determining whether the object is genuine based on the matching determination information to generate information for determining whether the object is genuine.

According to an embodiment, the verification model may include the image matching analysis model that is pre-trained to determine whether the images included in each of the one or more verification image sets match. Whether each image matches may include information on whether there is a difference between each image.

Figure 5:
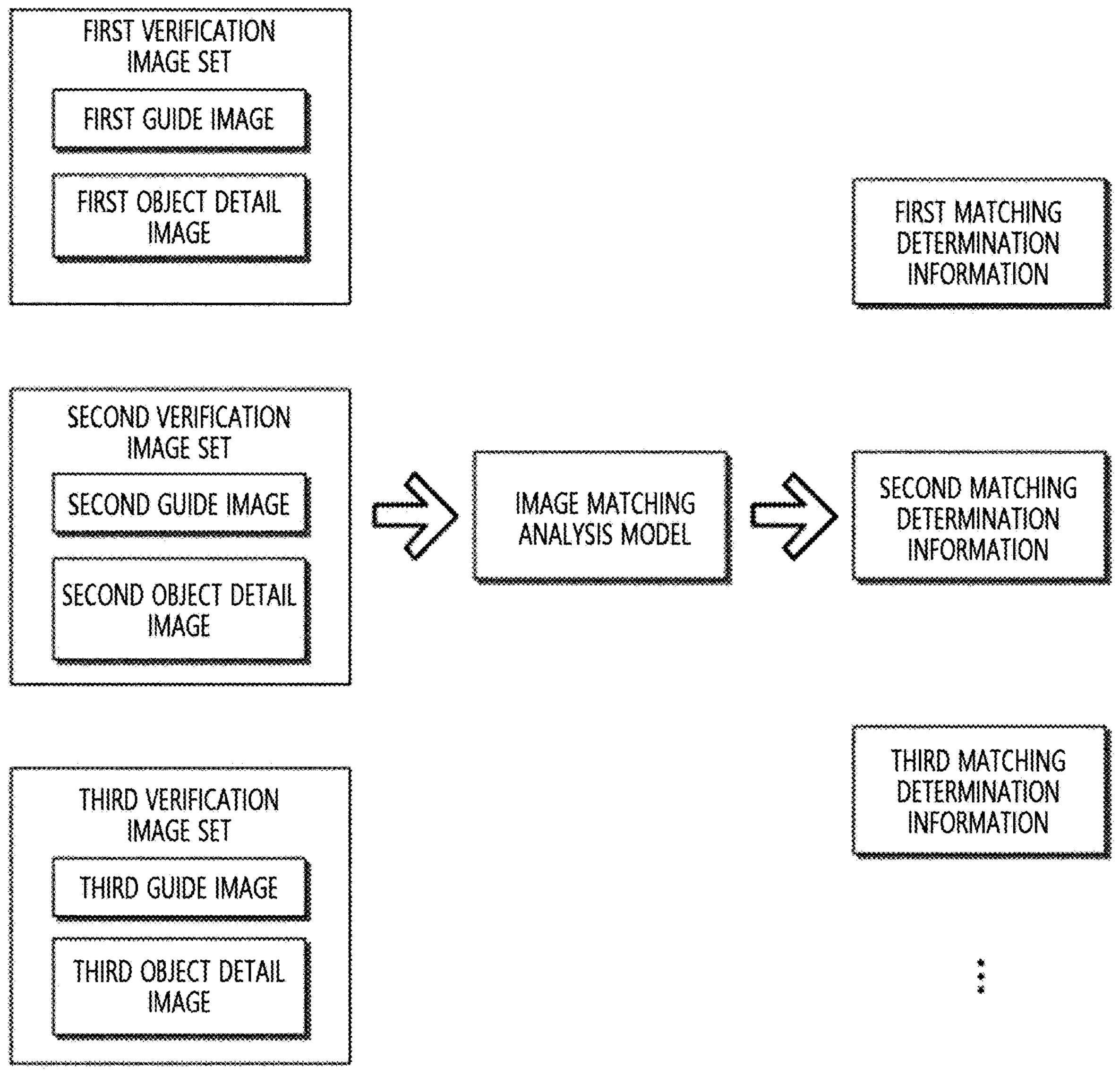
FIG. 5 is an exemplary diagram for describing a process of determining whether images match using an analysis model according to an embodiment of the present invention.

For example, as illustrated in FIG. 5, a first verification image set may include the first guide image and the first object detail image corresponding to the first guide image, a second verification image set may include the second guide image and a second object detail image corresponding to the second guide image, and a third verification image set may include the third guide image and a third object detail image.

In an embodiment, the image matching analysis model may be an artificial intelligence model trained to determine the similarity between each image. The image matching analysis model may be a neural network model that determines whether there is a difference between the guide image and the object detail image included in each verification image set by comparing the images.

In various embodiments, the image matching analysis model may calculate a similarity score between the images included in the verification image set. The image matching analysis model may extract one or more objects having features from each image included in each verification image set, and calculate a similarity score corresponding to the verification image set through the comparison between the extracted objects. The image matching analysis model may identify and extract all feature parts having unique features from each image, and perform a comparison between the extracted feature parts to determine the similarity between the guide image and the object detail image.

In an embodiment, the similarity score between the images included in the verification image set may be performed based on a comparison between various objects included in each image. For example, by inputting each object included in each image to a dimension reduction network function, an embedding corresponding to each object may be acquired, and the similarity between objects corresponding to each image may be evaluated through the embedding similarity. In addition, for example, the similarity between each object may be evaluated by using a cosine similarity that measures the similarity by calculating a cosine angle between the embedded vectors. For another example, a Siamese network and a transformer-based model may be used to determine a semantic text similarity. The detailed description of the similarity evaluation method described above is only an example, and the present invention is not limited thereto. In an additional embodiment, the similarity between objects may be measured using a Jaccard similarity, a Euclidean distance, and Wordnet.

The similarity score is derived based on the similarity evaluation between the objects output by the image matching analysis model. The higher the similarity between the objects, the higher the similarity score is calculated, and the lower the similarity between the objects, the lower the similarity is calculated.

In various embodiments, the image matching analysis model may determine whether the guide image and the object detail image match based on matching determination factor information labeled in each guide image. The matching determination factor information may include information on an object that should be intensively reviewed in each image. For example, the first guide image may be an image obtained by capturing the zipper area of the bag, and the matching determination factor information labeled in the corresponding guide image may include the matching determination factor information indicating that the 'stitching pattern' is important in the corresponding image. The image matching analysis model determines whether the matching is made by comparing each guide image based on the matching determination factor information. Accordingly, it is possible to determine whether two images match by focusing on the comparison of the stitching pattern areas within each image.

That is, as illustrated in FIG. 5, the image matching analysis model may process each verification image set as input to output the matching determination information corresponding to each verification image set. Specifically, the image matching analysis model may output first matching determination information corresponding to the first verification image set, second matching determination information corresponding to the second verification image set, and third matching determination information corresponding to the third verification image set.

In addition, in an embodiment, the verification model may include an object extraction model that identifies and extracts a main analysis object from the images included in each of the one or more verification image sets to generate one or more extracted image sets. In this case, the verification model may output the matching determination information based on one or more extracted image sets generated by the object extraction model.

Identifying the main analysis object from each image may be performed based on the matching discrimination factor information corresponding to the guide image. The object extraction model may perform segmentation on a specific area of the guide image based on the matching discrimination factor information of the guide image, and perform the segmentation on the specific area of the corresponding object detail image. That is, as the segmentation for the specific area is performed in the guide image, the guide extraction image may be generated and the segmentation for the specific area is performed in the object detail image, the object detail extraction image may be generated.

When the object extraction model is used, the main part in each image is segmented and separated separately, and only the separated region may be compared to determine whether the matching is made, so the accuracy of determining whether the matching is made may be improved, and furthermore, the accuracy of determining whether the object is genuine may be improved.

Figure 6:
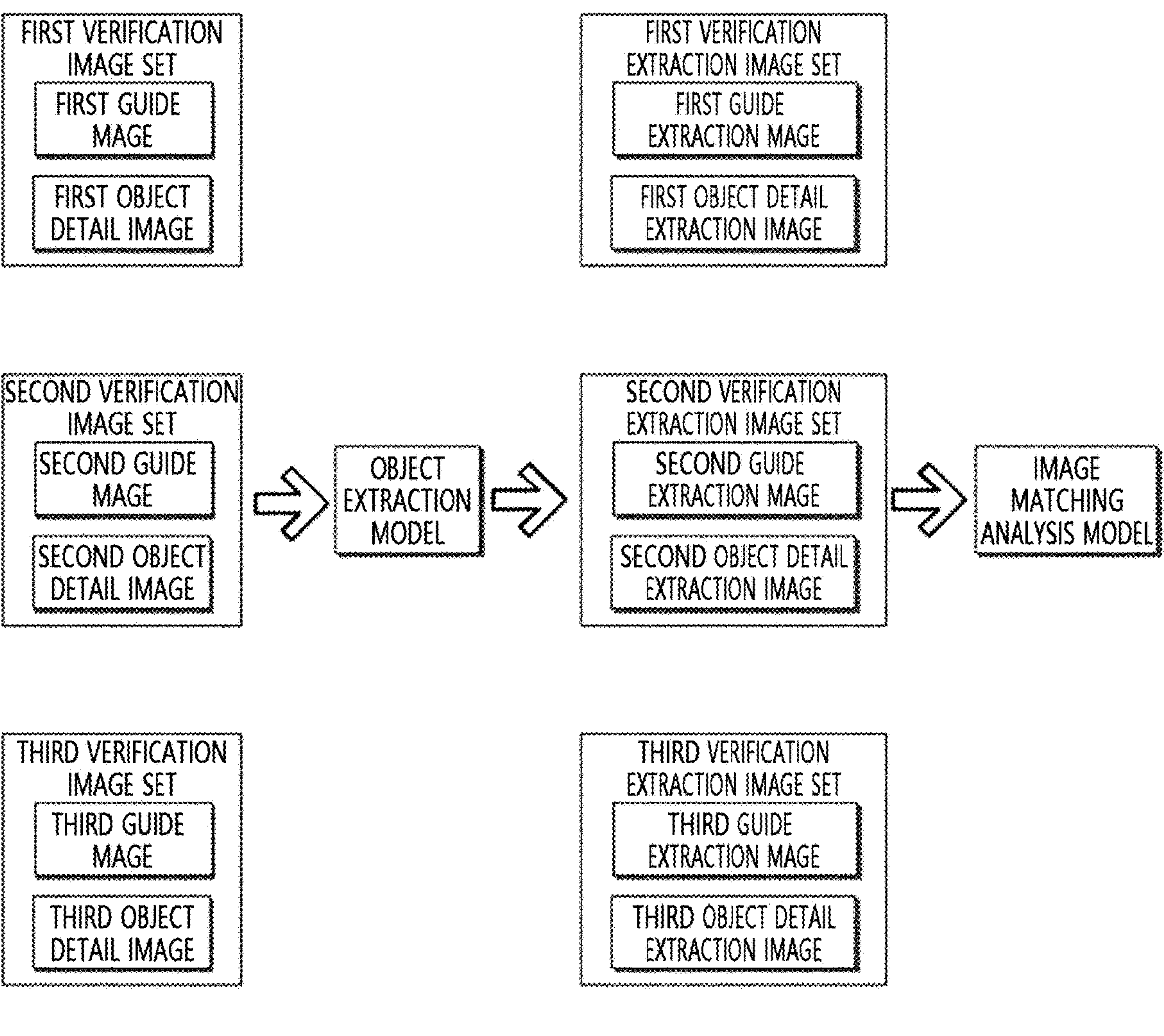
FIG. 6 is an exemplary diagram for describing that the accuracy of determining whether each image matches may be improved by using an object extraction model according to an embodiment of the present invention.

For example, the object extraction model may segment and separately extract a specific part (e.g., a logo) from the guide image and the object detail image. That is, as illustrated in FIG. 6, the object extraction model may output a verification extraction image set by using each verification image set as input. The object extraction model may output a first verification extraction image set by using the first verification image set as input, a second verification extraction image set by using the second verification image set as input, and a third verification extraction image set by using the third verification image set as input. In this case, the image matching analysis model outputs each piece of matching determination information based on each verification extraction image set. Specifically, the image matching analysis model may output the first matching determination information by using the first verification extraction image set as input, the second matching determination information by using the second verification extraction image set as input, and the third matching determination information by using the third verification extraction image set as input.

That is, as illustrated in FIG. 6, when the specific part is segmented and extracted within the guide image and the object detail image using the object extraction model to generate a separate image (i.e., a verification extraction image set) and the extracted area images are processed as the input of the image matching analysis model to perform the comparison between each image, the accuracy of the matching determination may be improved.

According to an embodiment, the verification model may output the matching determination information based on one or more extracted image sets generated by the object extraction model. The object extraction model may output each verification extraction image set corresponding to each verification image set. In this case, each verification extraction image set is processed as the input of the image matching analysis model, and thus, it is determined whether the images included in each verification extraction image set match. That is, the image matching analysis model may output the matching determination information related to whether the guide image and the object detail image included in each verification extraction image set match.

In an embodiment, the matching determination information may be generated based on the numerical information related to the similarity probability calculated corresponding to each verification extraction image set (or, each verification image set). When each image set is processed as input to the image matching analysis model, a score for the similarity probability between images included in the image set is calculated, and the calculated score for the similarity probability may be output.

In various embodiments, the matching determination information may be generated based on whether the calculated score for the corresponding similarity probability exceeds a predetermined reference value. According to an embodiment, the higher the score for the similarity probability is calculated, the higher the similarity between the compared images may be, and the lower the score for the similarity probability is calculated, the lower the similarity between the compared images may be.

For a specific example, as the first verification extraction image set is input to the image matching analysis model, the score for the similarity probability between the first guide extraction image included in the first verification extraction image set and the first object detail extraction image may be output as 82, and the predetermined reference value that is a reference may be 88. The verification model may compare the similarity score between each image with a predetermined reference value, and generate the matching determination information indicating that the image is not matched by identifying that the similarity score does not exceed the predetermined reference value. The specific numerical description of the score and the predetermined reference value for the above-described similarity probability is only an example, and the present invention is not limited thereto.

That is, the verification model may generate the matching determination information indicating that there is no match when the similarity score between each image is less than or equal to the predetermined reference value, and may generate the matching determination information indicating that there is a match when the similarity score between each image exceeds the predetermined reference value.

According to an embodiment, the verification model may determine whether the object is genuine based on the matching determination information related to the output of the image matching analysis model. For example, whether the object is genuine may be determined based on the number of pieces of matching determination information determined to be mismatched.

Figure 7:
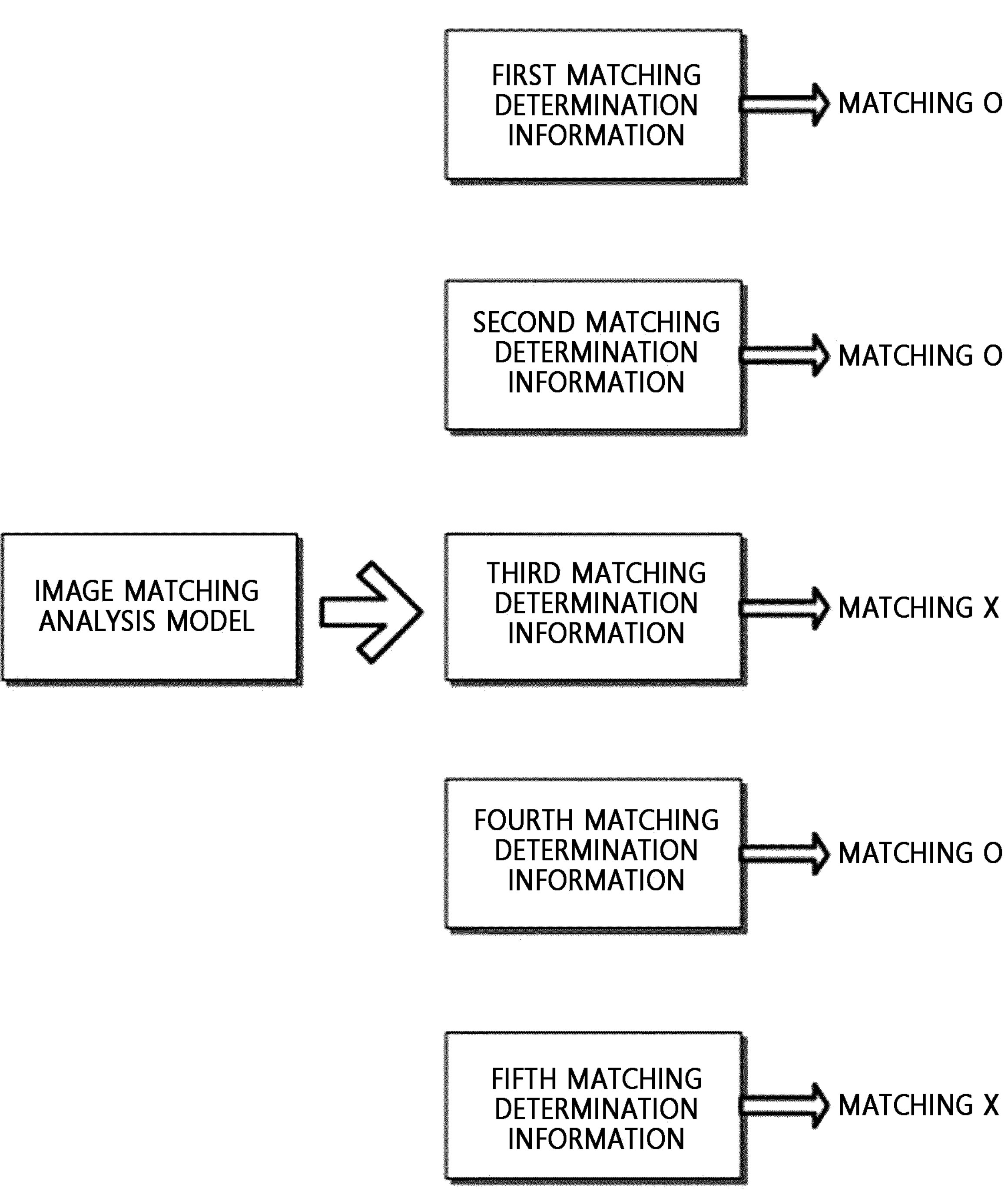
FIG. 7 is an exemplary diagram for describing a process of generating information for determining whether the object is genuine by considering matching determination information according to an embodiment of the present invention.

For example, as illustrated in FIG. 7, when it is determined that at least two verification image sets are determined to be non-matched (e.g., the third matching determination information and the fifth matching determination information), the verification model may determine that the object is counterfeit. That is, in an area where various comparison determination factors exist corresponding to the object, when two or more do not pass the verification criteria, the object may be determined to be counterfeit.

Conversely, when all the verification image sets are determined to be mismatched, the verification model may determine that the object is genuine.

On the other hand, when only one verification image set is determined to be mismatched, a user interface (e.g., a user comparison interface) may be generated based on one verification image set (or a verification image extraction set) determined to be mismatched and provided to the user terminal 200. In this case, the user of the user terminal 200 confirms the guide image and object detail image displayed through the user interface to determine whether the guide image and object detail image match, thereby inputting whether the guide image and object detail image match the user interface. In this case, the server 100 determines whether the object is genuine based on the user's input that is input through the user interface.

In other words, when only one verification image set is determined to be mismatched, the user interface including the guide image and the object detail image judged to be mismatched may be provided to the user terminal in order to receive the determination on the mismatched images from the user (manager).

In various embodiments, the server 100 may determine whether the object is genuine through a manual method based on the user's input. That is, the server 100 may allow the user to directly perform the verification in addition to the artificial intelligence-based automatic comparison. In this case, the server 100 may generate and provide the user comparison interface to improve the convenience of the verification process.

Figure 8:
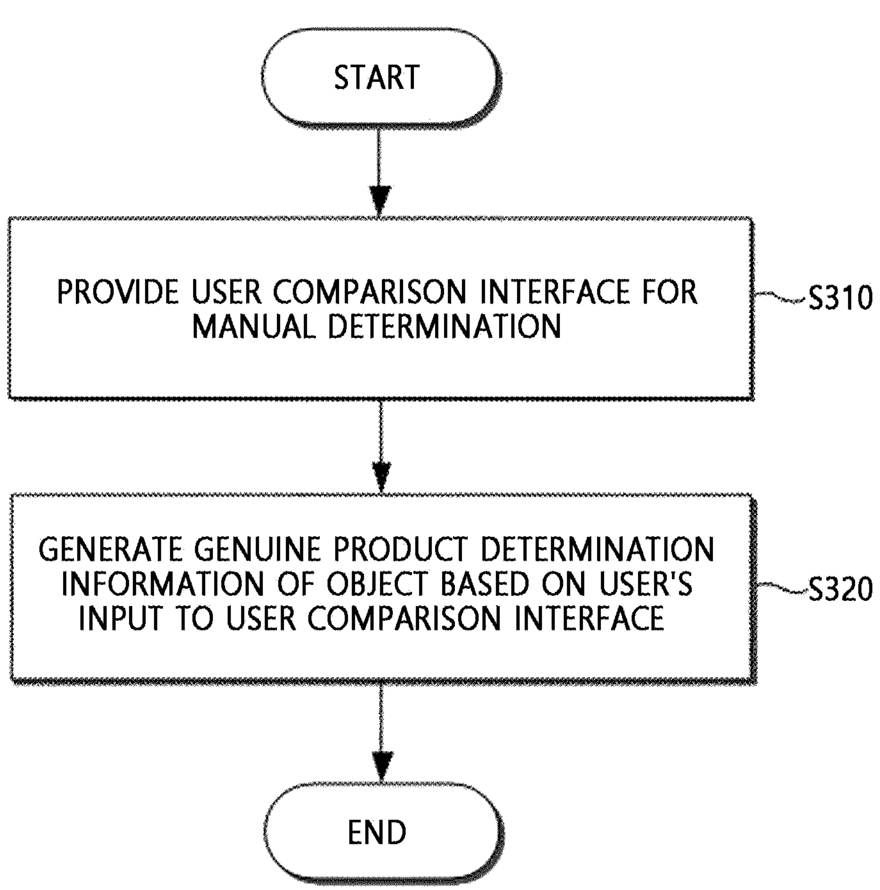
FIG. 8 is a flowchart schematically illustrating a process of determining whether an object is genuine through manual determination according to an embodiment of the present invention.

In the embodiment, as illustrated in FIG. 8, the determining of whether the object is genuine may include providing the user comparison interface for the manual determination (S310) and generating the genuine product determination information of the object based on the user's input to the user comparison interface (S320).

According to a specific embodiment, the determining of whether the object is genuine may include generating and providing the user comparison interface for the manual determination, generating the genuine product determination information based on the user's input to the user comparison interface, and generating the information for determining whether the object is genuine based on the genuine product determination information.

The user comparison interface may include the comparison display screen for comparing and displaying the guide image and the object detail image corresponding to each other. The user comparison interface may display the guide image and the object detail image corresponding to each other, and may sequentially display images corresponding to each verification image set through a user's selection input for a specific graphic object (e.g., a next image display graphic object or a previous image display graphic object).

According to an embodiment, the generating and providing of the user comparison interface for the manual determination may include generating the guide extraction image and the object detail extraction image corresponding to each guide image and each object detail image using the object extraction model, and the user comparison interface may include the detail confirmation graphic object that receives the user's input for comparing and displaying the guide extraction image and the object detail extraction image corresponding to each of the guide image and the object detail image.

The server 100 may segment and separately extract the specific areas from each of an image (i.e., an object detail image) of an actual object and a genuine product image (i.e., a guide image) corresponding to an object. In an embodiment, the server 100 may segment and extract specific parts within the guide image and the object detail image using the object extraction model to generate a separate image (i.e., a verification extraction image set) and generate the user comparison interface based on the extracted area images. That is, the user comparison interface provided by the server 100 may compare and display the image of the actual object and the genuine product image corresponding to the object, and extract only a specific area (e.g., an area important for determining whether an object is genuine) within each image and display the enlarged specific area. For example, the server 100 may extract a sentence located at a specific location in each image using the object extraction model and display the enlarged sentence. Accordingly, since the sentences of each image are displayed separately, the user may compare the forms of each sentence in more detail. This is a configuration that makes it easy to identify points that are difficult to find when viewed as a whole, and has the advantage of providing convenience in comparison analysis between images.

According to an embodiment, a user confirms the verification image sets displayed on the comparison display screen of the user interface, that is, the corresponding guide images and object detail images, and inputs a selection input for whether each image matches or does not match each other. When the guide image and the object detail image correspond to each other, the user may select a first graphic object (e.g., a "matching" button), and when the guide image and the object detail image are different from each other, the user may select a second graphic object (e.g., a "mismatching" button). Based on the user's input that is input to the user comparison interface, the server 100 may generate the matching evaluation information corresponding to the corresponding images, and determine whether the object is genuine based on each matching evaluation information corresponding to each verification image set.

In various embodiments, the server 100 may more easily perform the determination of whether the object is counterfeit by overlapping and displaying the corresponding images.

In a specific embodiment, the user comparison interface may include an overlap confirmation graphic object that receives the user's input for comparing and displaying the images corresponding to at least one of the verification image set related to the guide image and the object detail image or the verification image set related to the guide extraction image and the object detail extraction image by overlapping the images.

When the user performs a selection input to the overlap confirmation graphic object in the user comparison interface, the corresponding images may be overlapped and displayed in one layer. That is, the server 100 may overlap and display the corresponding guide image and the object detail image in one layer in response to the user's selection input to the overlap confirmation graphic object. In this way, when each image is overlapped and displayed, it is possible to more easily determine whether each image matches. That is, it is possible to allow the user to more easily perform the comparison between the two images. Through this configuration, it is easy to compare the corresponding images, and it may lead to improvement in the accuracy of the determination of whether the corresponding images match, and as a result, it is possible to improve the accuracy of determining whether the object is genuine.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a CD-ROM, or in any form of computer-readable recording media known in the art to which the invention pertains.

The components of the present invention may be embodied as a program (or application) and stored in media for execution in combination with a computer which is hardware. The components of the present invention may be executed in software programming or software elements, and similarly, embodiments may be realized in a programming or scripting language such as C, C++, Java, and assembler, including various algorithms implemented in a combination of data structures, processes, routines, or other programming constructions. Functional aspects may be implemented in algorithms executed on one or more processors.

According to various embodiments of the present invention, by automatically determining whether a product is counterfeit using the artificial intelligence, it is possible to provide the artificial intelligence-based counterfeit analysis service that determines whether the product is counterfeit even without the expert knowledge of the product.

Effects of the present invention are not limited to the effects described above, and other effects that are not mentioned may be obviously understood by those skilled in the art from the following description.

Although exemplary embodiments of the present invention have been described with reference to the accompanying drawings, those skilled in the art will understand that various modifications and alterations may be made without departing from the spirit or essential feature of the present invention. Therefore, it is to be understood that the exemplary embodiments described hereinabove are illustrative rather than being restrictive in all aspects.

What is claimed is:

1. A method of providing an artificial intelligence-based counterfeit analysis service, which is performed by one or more processors of a computing device, the method comprising:

receiving, from a user terminal, an object image related to a specific object;

identifying a sample object image corresponding to the object image, through an image search using an image database;

acquiring the sample object image from the image database;

acquiring one or more guide images corresponding to the sample object image;

providing the one or more guide images to the user terminal;

capturing, by a camera of the user terminal, images based on the one or more guide images;

receiving the captured images from the user terminal;

acquiring, from the captured images, one or more object detailed images, wherein a respective object detail image of the one or more object detail images corresponds to each of the one or more guide images; and determining whether the object is genuine by performing an analysis on the one or more guide images and the one or more object detail images, wherein the performing of the analysis is performed based on a pre-trained artificial intelligence model, which determines whether the one or more guide images match with the one or more object detail images, wherein the acquiring of the one or more object detail images comprises:

acquiring a plurality of first object detail candidate images corresponding to a first guide image;

identifying a plurality of objects included in the first guide image and each of the plurality of first object detail candidate images; and selecting a first object detail image corresponding to the first guide image through a comparison based on the plurality of objects identified in each image.

2. The method of claim 1, wherein the sample object image includes an image captured from an actual genuine product related to the object, and the one or more guide images are detailed images of each of one or more factors that affect determination of whether the object is genuine within the object image and are images that serve as references for acquiring the one or more object detail images.

3. The method of claim 1, wherein the acquiring of the sample object image corresponding to the object image includes:

acquiring image category information corresponding to the object image; and acquiring the sample object image by searching the image database based on the image category information and the object image, and the image database pre-stores information on at least one of genuine information, fake information, and counterfeit determination information corresponding to each of a plurality of objects by subdividing the information for each type of objects.

4. The method of claim 1, wherein the determining of whether the object is genuine includes:

grouping corresponding images among the one or more guide images and the one or more object detail images to generate one or more verification image sets;

processing each of the one or more verification image sets as input to a verification model to output matching determination information on whether the images corresponding to each verification image set match; and determining whether the object is genuine based on the matching determination information to generate information for determining whether the object is genuine.

5. The method of claim 4, wherein the verification model includes an object extraction model that identifies and extracts a main analysis object from images included in each of the one or more verification image sets to generate one or more extracted image sets, and outputs the matching determination information based on the one or more extracted image sets generated by the object extraction model.

6. The method of claim 1, wherein the determining of whether the object is genuine includes:

generating and providing a user comparison interface for manual determination;

generating genuine product determination information based on a user's input to the user comparison interface; and generating information for determining whether the object is genuine based on the genuine product determination information, and the user comparison interface includes a comparison display screen for comparing and displaying guide images and object detail images corresponding to each other.

7. The method of claim 6, wherein the generating and providing of the user comparison interface for the manual determination includes generating a guide extraction image and an object detail extraction image corresponding to each guide image and each object detail image using an object extraction model, and the user comparison interface includes a detail confirmation graphic object that receives the user's input for comparing and displaying the guide extraction image and the object detail extraction image corresponding to each of the guide image and the object detail image.

8. The method of claim 7, wherein the user comparison interface includes an overlap confirmation graphic object that receives a user's input for comparing and displaying images corresponding to at least one of a verification image set related to the guide image and the object detail image or a verification image set related to the guide extraction image and the object detail extraction image by overlapping the images.

9. A system comprising:

a server comprising:

a memory configured to store one or more instructions; and a processor configured to execute the one or more instructions stored in the memory; and a user terminal, wherein the processor of the server executes the one or more instructions to perform operations of:

receiving, from a user terminal, an object image related to a specific object;

identifying a sample object image corresponding to the object image, through an image search using an image database;

acquiring the sample object image from the image database;

acquiring one or more guide images corresponding to the sample object image;

providing the one or more guide images to the user terminal;

capturing, by a camera of the user terminal, images based on the one or more guide images;

receiving the captured images from the user terminal;

receiving captured images from the user terminal, wherein the captured images are captured by the user terminal based on the one or more guide images;

acquiring, from the captured images, one or more object detailed images, wherein a respective object detail image of the one or more object detail images corresponds to each of the one or more guide images; and determining whether the object is genuine by performing an analysis on the one or more guide images and the one or more object detail images, wherein the performing of the analysis is performed based on a pre-trained artificial intelligence model, which determines whether the one or more guide images match with the one or more object detail images, wherein the acquiring of the one or more object detail images comprises:

acquiring a plurality of first object detail candidate images corresponding to a first guide image;

identifying a plurality of objects included in the first guide image and each of the plurality of first object detail candidate images; and selecting a first object detail image corresponding to the first guide image through a comparison based on the plurality of objects identified in each image.

10. A non-transitory computer-readable recording medium on which a program for executing a method of providing an artificial intelligence-based counterfeit analysis service in conjunction with a system including a server and a user terminal is recorded, wherein the method performed by the server comprises:

receiving, from the user terminal, an object image related to a specific object;

identifying a sample object image corresponding to the object image, through an image search using an image database;

acquiring the sample object image from the image database;

acquiring one or more guide images corresponding to the sample object image;

providing the one or more guide images to the user terminal;

capturing, by a camera of the user terminal, images based on the one or more guide images;

receiving the captured images from the user terminal;

acquiring, from the captured images, one or more object detailed images, wherein a respective object detail image of the one or more object detail images corresponds to each of the one or more guide images; and determining whether the object is genuine by performing an analysis on the one or more guide images and the one or more object detail images, wherein the performing of the analysis is performed based on a pre-trained artificial intelligence model, which determines whether the one or more guide images match with the one or more object detail images, wherein the acquiring of the one or more object detail images comprises:

acquiring a plurality of first object detail candidate images corresponding to a first guide image;

identifying a plurality of objects included in the first guide image and each of the plurality of first object detail candidate images; and selecting a first object detail image corresponding to the first guide image through a comparison based on the plurality of objects identified in each image.

* * * * *